(12) United States Patent
Zhang et al.

(10) Patent No.: US 11,722,062 B2
(45) Date of Patent: Aug. 8, 2023

(54) POWER SUPPLY DEVICE, ELECTRONIC DEVICE AND POWER SUPPLY METHOD

(71) Applicant: GUANGDONG OPPO MOBILE TELECOMMUNICATIONS CORP., LTD., Guangdong (CN)

(72) Inventors: Jialiang Zhang, Dongguan (CN); Hongbin Xie, Dongguan (CN); Jun Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 118 days.

(21) Appl. No.: 17/481,414

(22) Filed: Sep. 22, 2021

(65) Prior Publication Data
US 2022/0006381 A1    Jan. 6, 2022

Related U.S. Application Data

(63) Continuation of application No. PCT/CN2019/079321, filed on Mar. 22, 2019.

(51) Int. Cl.
*H02M 3/158* (2006.01)
*H02J 7/00* (2006.01)
*H02J 7/06* (2006.01)

(52) U.S. Cl.
CPC ..... *H02M 3/1582* (2013.01); *H02J 7/007182* (2020.01); *H02J 7/06* (2013.01); *H02J 2207/20* (2020.01)

(58) Field of Classification Search
CPC .... H02M 3/1582; H02J 7/007182; H02J 7/06; H02J 2207/20
See application file for complete search history.

(56) References Cited

U.S. PATENT DOCUMENTS

| 6,198,250 B1 * | 3/2001 | Gartstein | .......... H01M 10/4264 |
| | | | 320/112 |
| 9,166,437 B2 | 10/2015 | Hamburgen | |
| 9,397,506 B2 * | 7/2016 | Keates | ................ H01M 10/441 |

FOREIGN PATENT DOCUMENTS

CN    201528216 U    7/2010
CN    105207316 A    12/2015
(Continued)

OTHER PUBLICATIONS

International search report issued in corresponding international application No. PCT/CN2019/079321 dated May 9, 2019.
(Continued)

*Primary Examiner* — Adolf D Berhane
*Assistant Examiner* — Afework S Demisse
(74) *Attorney, Agent, or Firm* — Perkins Coie LLP

(57) ABSTRACT

A power supply device, an electronic apparatus, and a power supply method are provided. The power supply device comprises a first buck circuit used to convert, if a single battery cell in N cells connected in series has a voltage lower than a shutdown voltage of an electronic apparatus, a total voltage of the N cells into a power supply voltage of the electronic apparatus, such that the power supply voltage is higher than or equal to the shutdown voltage, N being an integer greater than or equal to 2; and a first power supply channel used to supply power to a system of the electronic apparatus according to the power supply voltage.

13 Claims, 6 Drawing Sheets

(56) References Cited

FOREIGN PATENT DOCUMENTS

| | | |
|---|---|---|
| CN | 205509556 U | 8/2016 |
| CN | 208369272 U | 1/2019 |
| WO | WO-2012138010 A1 * 10/2012 | .......... B60L 15/2045 |

OTHER PUBLICATIONS

Extended European search report issued in corresponding European application No. 19921909.8 dated Feb. 16, 2022. 7 pages.

\* cited by examiner

In the case that the voltage of the single cell in the N cells series connected with each other is lower than the shutdown voltage of the electronic device, use the first step-down circuit to convert the total voltage of the N cells into the power supply voltage of the electronic device such that the supply voltage is greater than the shutdown voltage, N is an integer greater than or equal to 2 ～ S510

Use the first power supply channel to supply power to the system of the electronic device according to the supply voltage ～ S520

FIG. 5

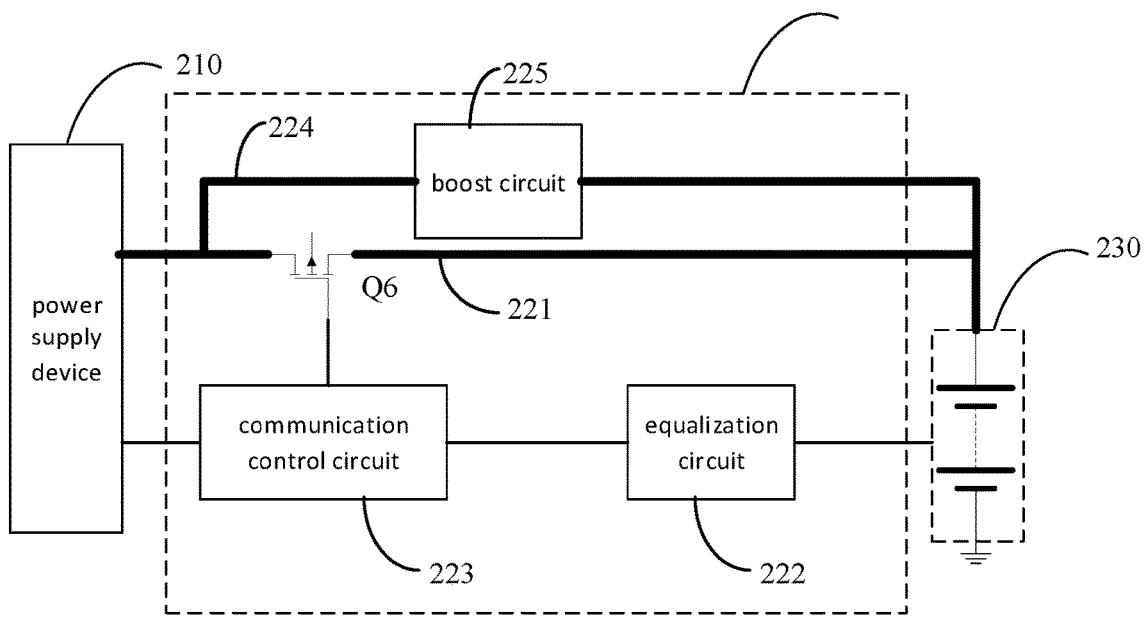

FIG. 6

POWER SUPPLY DEVICE, ELECTRONIC DEVICE AND POWER SUPPLY METHOD

CROSS-REFERENCE TO RELATED APPLICATION

The present application is a continuation of PCT Application No. PCT/CN2019/079321, filed on Mar. 22, 2019, the contents of which are incorporated herein by reference in their entirety.

BACKGROUND

With the continuous development of technology, the functions of electronic devices have been continuously enhanced. More and more functions have put forward higher requirements on the power of electronic devices, and increasing the usage of battery capacity can maximize the use of battery. Therefore, how to improve the usage of battery capacity has become a key factor of 3 increasing battery power.

SUMMARY

The present disclosure provides a power supply device, electronic device, and power supply method, which can improve the usage of battery capacity.

According to a first aspect of the present disclosure, a power supply device is provided, comprising: a first step-down circuit used for, in case a voltage of a single battery cell among N battery cells connected in series being lower than a shutdown voltage of an electronic device, converting a total voltage of N battery cells connected in series into a power supply voltage of the electronic device, so that the power supply voltage is higher than or equal to the shutdown voltage, wherein N is an integer greater than or equal to 2; and a first power supply channel used for, according to the power supply voltage, supplying power to a system of the electronic device.

According to a second aspect of the present disclosure, an electronic device is provided, comprising: a battery, and a power supply device of any implementation according to the first aspect.

According to a third aspect of the present disclosure, a power supply method is provided, comprising: in case a voltage of a single battery cell among N battery cells connected in series being lower than a shutdown voltage of an electronic device, converting a total voltage of N battery cells connected in series, by a first step-down circuit, into a power supply voltage of the electronic device, so that the power supply voltage is higher than or equal to the shutdown voltage, wherein N is an integer greater than or equal to 2; and supplying power to a system of the electronic device through a first power supply channel according to the power supply voltage. Embodiments of the present disclosure relate to intra prediction in the field of video coding, and in particular, to a chroma intra prediction method and device.

BRIEF DESCRIPTION OF THE DRAWINGS

FIG. 5 is a schematic flowchart of a power supply method provided by an embodiment of the present disclosure.

FIG. 6 is a schematic structural diagram of a charging device provided by an embodiment of the present disclosure.

DETAILED DESCRIPTION

Figure 1:
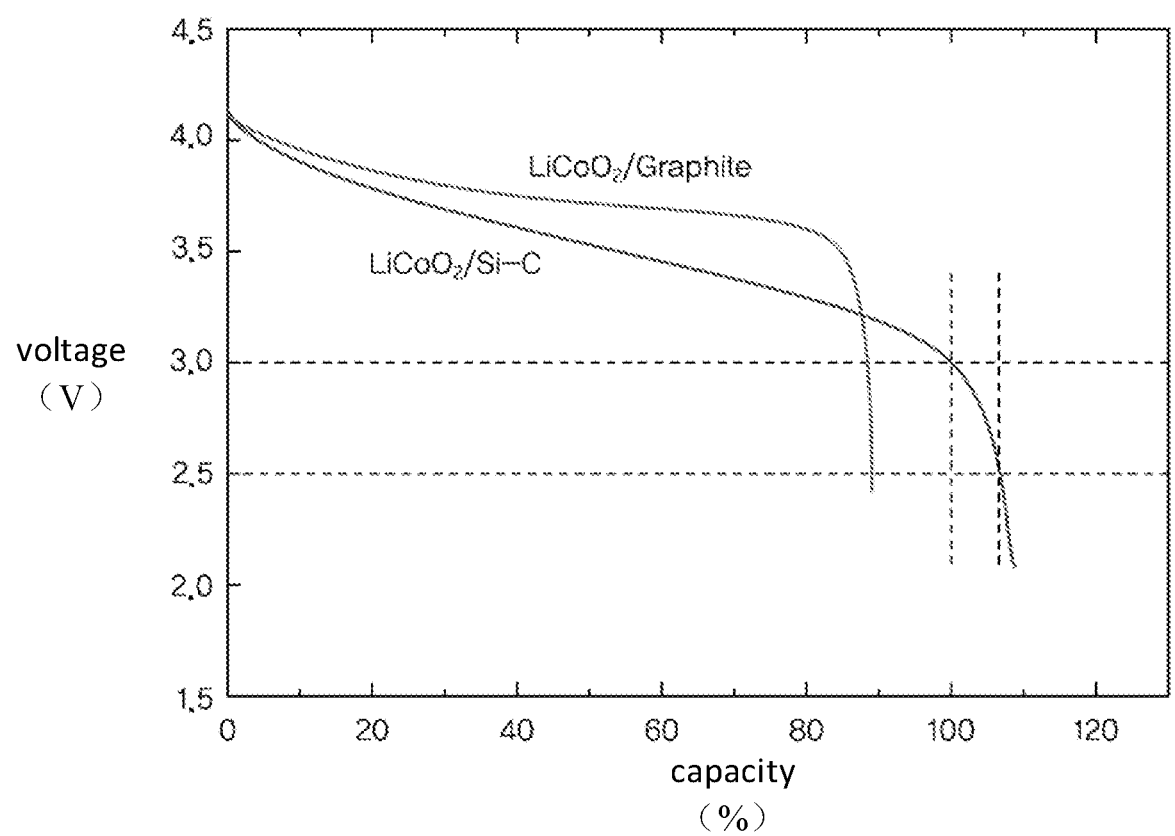
FIG. 1 is a graph of discharge curves of batteries with different negative electrode materials.

The technical solutions in the embodiments of the present disclosure will be clearly and completely described below in conjunction with the accompanying drawings in the embodiments of the present disclosure. It is understandable that the specific embodiments described here are only used to explain the related disclosure, but not to limit the present disclosure. In addition, it is to be noted that for ease of description, only the parts related to the relevant disclosure are illustrated in the drawings.

With the continuous development of electronic devices, the functions of electronic devices have been continuously enhanced, and the operating intensity and requirements from users have also been further improved. All these have put forward higher requirements for the power and battery life of electronic devices. For example, functions such as wireless Internet access, high-speed data transmission, Bluetooth connection to smart homes, higher camera requirements, and video transmission all place higher requirements on the power of electronic devices.

The electronic device mentioned in the embodiments of this disclosure includes, but is not limited to, a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of mobile terminals include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver. In some embodiments, the electronic device mentioned in the embodiments of the present disclosure may be a chip system. In the embodiment, the battery of the electronic device may or may not belong to the chip system.

In addition, electronic devices can also include other electronic devices whose system need to be charged, such as mobile phones, mobile power sources (such as power banks, travel chargers, etc.), electric cars, laptops, drones, tablets, e-books, e-cigarettes, Intelligent electronic device and small electronic products, etc. Smart electronic devices can include, for example, watches, bracelets, smart glasses, and sweeping robots, etc. Small electronic products may include, for example, wireless headsets, Bluetooth speakers, electric toothbrushes, and rechargeable wireless mice, etc.

At present, most of the commonly used power supply and energy storage batteries are lithium ion batteries, and the most commonly used negative electrode of lithium ion batteries is the graphite negative electrode. Although graphite negative electrode are cheap and have a series of advantages such as low lithium insertion potential, with the continuous enhancement of smart terminals and electric vehicle functions in recent years, and the continuous application of 5G networks, graphite negative electrode have gradually been unable to meet users' demand for electric quantity.

The electric quantity of the battery is closely related to the energy density of the battery. The greater the energy density of the battery, the greater the electric quantity of the battery. In the current graphite-based lithium ion battery, the energy density of the battery is generally 500-700 Wh/L, but this gradually cannot meet the user's requirements on battery life of electronic devices.

The energy density of the battery is related to the specific capacity of the battery. The specific capacity of the battery includes the positive electrode specific capacity and the negative electrode specific capacity. The negative electrode specific capacity determines nearly half of the specific capacity of the battery. The available capacity of the battery is also related to the tilt of the negative electrode delithiation voltage platform. The flatter the delithiation voltage platform, the higher the available capacity of the negative electrode and the higher the specific capacity of the battery. Therefore, the specific capacity of the negative electrode of the battery is a key factor in determining the specific capacity of the battery.

The theoretical specific capacity of the traditional graphite negative electrode is about 372 mAh/g, and the lithium insertion voltage is about 0.05V. Since silicon can form a multiphase alloy with lithium, the theoretical specific capacity at room temperature is relatively large, about 3600 mAh/g, greater than the theoretical specific capacity of the graphite negative electrode, and the lithium insertion voltage of the silicon negative electrode is about 0.4V, which is also higher than the lithium insertion voltage of the graphite negative electrode. Therefore, the specific capacity of the lithium ion batteries negative electrodes can be increased by using silicon negative electrodes.

Under normal circumstances, the greater the product of the battery's specific capacity and the lithium insertion voltage, the greater the battery's energy density. Therefore, the energy density of the silicon negative electrode lithium ion battery is greater than that of the graphite negative electrode. It can be seen from the above that the silicon negative electrode is a very potential way to increase the energy density of lithium ion batteries at the negative electrode level in the future.

However, in case the silicon negative electrode is adopted on the lithium ion battery, the discharge curve of the silicon negative electrode is different from that of the traditional graphite negative electrode. FIG. 1 shows the discharge curve of lithium ion batteries in which the positive electrode material is lithium cobalt oxide and the negative electrode material is graphite and silicon carbide.

The capacity of the graphite negative electrode below 3.4V is very small, about 5%; while the capacity of the silicon negative electrode below 3.4V is greater than 15%. Taking the electronic device such as a mobile phone as an example, the current protection shutdown voltage of the mobile phone system is 3.4V. Therefore, if a silicon-containing negative electrode battery is directly used under the current framework, the system will directly shut down when the battery voltage is lower than 3.4V. Nearly 15% of the silicon negative electrode cannot be discharged and cannot be used to power the system. Therefore, the advantage of high energy density of silicon negative electrode cannot be played out.

As shown in FIG. 1, when the cut-off voltage is set at 3.0V, the available capacity of the silicon negative electrode can be increased by about 10% compared to the graphite negative electrode; when the cut-off voltage is set at 2.5V, the available capacity of the silicon negative electrode can be increased by about 15% compared to the graphite negative electrode, wherein the cut-off voltage can be understood as the voltage when the battery stops discharging. Therefore, the capacity of the lithium ion battery with a silicon negative electrode can release more energy on at low voltage. How to make sufficient use of the capacity of the lithium ion battery with a silicon negative electrode at a low voltage has become an urgent problem to be solved. The embodiment of the present disclosure provides a power supply device that can fully utilize the energy of the silicon negative electrode at low voltage to improve the battery life.

The embodiment of the present disclosure does not limit the content of silicon in the silicon negative electrode, and it can be any value from 0% to 100%. With different silicon content, the discharge curve of the battery will be different. FIG. 1 shows the discharge curve when the silicon content is about 10%.

The embodiments of the present disclosure do not specifically limit the types of silicon negative electrode. For example, the silicon negative electrode may be pure nano-silicon, or may be silicon oxide, silicon carbide, or a mixture of silicon and graphite. Of course, the silicon negative electrode may also be a mixture of one or more of the above multiple substances. The embodiment of the present disclosure does not specifically limit the mixing ratio of the mixture, and it may be a mixture of any ratio.

The embodiments of the present disclosure do not limit the type of the battery. In addition to the lithium ion battery described above, it may also be other types of batteries, for example, a sodium ion battery. In addition to the silicon negative electrode, the negative electrode of the battery can also be a tin negative electrode.

Figure 2:
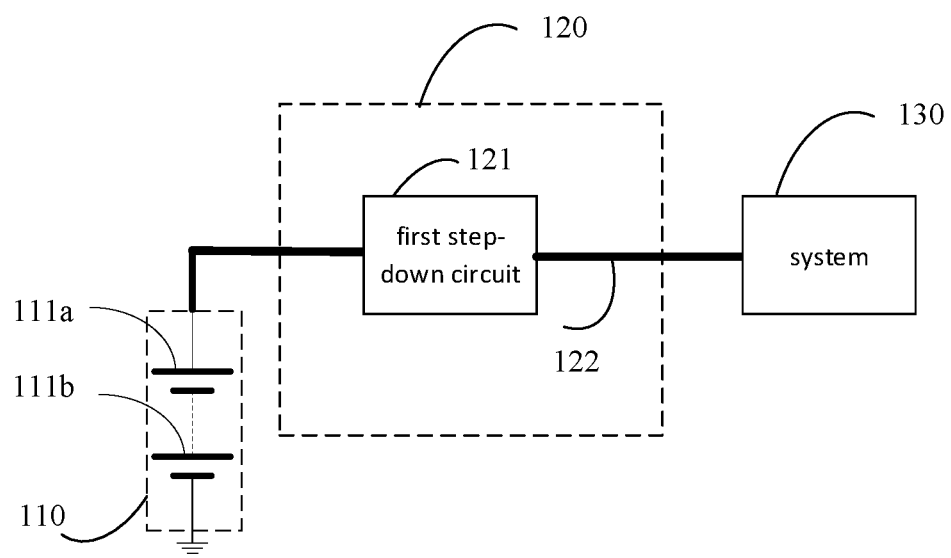
FIG. 2 is a schematic structural diagram of a power supply device provided by an embodiment of the present disclosure.

As shown in FIG. 2, the power supply device 120 provided in the embodiment of the present disclosure can be a power supply device that supplies power to a system 130 of electronic device through N battery cells 110 connected in series, and N≥2. The power supply device 120 comprises a first step-down circuit 121 and a first power supply channel 122. The first step-down circuit 121 can convert a total voltage of the N battery cells 110, in case a voltage of a single battery cell among N battery cells is lower than a shutdown voltage of an electronic device, into a power supply voltage of the electronic device, so that the power supply voltage is higher than or equal to the shutdown voltage. In other words, the voltage converted by the first step-down circuit 121 is higher than the voltage of the single battery cell. The first power supply channel 122 can be used to supply power to the system 130 of the electronic device according to the power supply voltage.

The first battery cell 111*a* and the second battery cell 111*b* shown in FIG. 2 can be any two cells in the N battery cells, or any two groups of cells in the N battery cells.

The N battery cells in the embodiment of the present disclosure can be packaged in one battery pack to form one battery, or it can be packaged in multiple battery packs to form N batteries. For example, the N battery cells may be one battery, and the battery comprises a first battery cell 111*a* and a second battery cell 111*b* connected in series. For another example, the battery may be two batteries, one battery includes the first battery cell 111*a*, and the other battery includes the second battery cell 111*b*.

The N battery cells 110 in the embodiment of the present disclosure may be cells with the same or similar specifications and parameters, or the specifications and parameters of the N battery cells 110 may be different or inconsistent. The scope of the disclosure is not limited to the embodiment shown in FIG. 2.

Normally, the system of the electronic device will automatically shut down in case the voltage of a single battery cell is lower than the shutdown voltage of the electronic device, so that the battery cell stops supplying power to the system to protect the battery cell, and prevent the battery cell from low capacity, thus preventing damage of the battery life.

If the battery cell still has relatively high power remaining when the voltage of a single battery cell is lower than the shutdown voltage of the electronic device, direct shutdown of the system will result in a waste of remaining power. The technical solution provided by the embodiment of the present disclosure can avoid this situation. Instead of shutting down the system directly, the total voltage of the N cells is converted, by a first step-down circuit, into a supply voltage capable of supplying power to the system, in the case of the voltage of a single battery cell in the N cell being lower than the shutdown voltage of the electronic device. The resulting benefit is that power supply to the system can be continued, and the remaining capacity of the battery can be applied to improve the utilization of battery power.

The voltage of a single battery cell in the embodiment of the present disclosure may refer to the voltage of the cell with the highest voltage among the N cells, that is, in case the voltage of each cell in the N cells is lower than the shutdown voltage of the electronic device, the first step-down circuit may convert the total voltage of the N cells into the supply voltage of the electronic device.

The voltage of a single battery cell may also refer to the voltage of the cell with the lowest voltage in the N cells, that is, in case the voltage of one cell in the N cells is lower than the shutdown voltage of the electronic device, the first step-down circuit may convert the total voltage of the N cells into the supply voltage of the electronic device.

The voltage of a single battery cell may also refer to the average voltage of the N cells. In case the average voltage of the N cells is lower than the shutdown voltage of the electronic device, the first step-down circuit may convert the total voltage of the N cells into the supply voltage of the electronic device.

Of course, the voltage of a single battery cell may also refer to the voltage of any single cell.

The embodiment of the present disclosure does not specifically limit the type of the battery cell, the battery cell may be a lithium ion battery or a sodium ion battery. The negative electrode of the battery can be a silicon negative electrode or a tin negative electrode. As long as the battery cell has much remaining capacity after the cut-off capacity.

The shutdown voltage of an electronic device can also be understood as the minimum value of the power supply voltage of the electronic device. When the voltage of a single battery cell is lower than the minimum value of the power supply voltage of the electronic device, it means that the voltage provided by the cell can no longer meet the requirements of powering the system. The shutdown voltage of the electronic device in the embodiment of the present disclosure is not specifically limited. The shutdown voltage can be specifically determined according to the product. For example, the shutdown voltage of the electronic device may be 3.4V, 3.2V, 3.7V, etc.

The first step-down circuit 121 in the embodiment of the present disclosure can handle the total voltage of the N cells, so that the voltage obtained after step-down meets the requirement of power supply voltage of the system 130. Optionally, the first step-down circuit 121 can adjust the step-down proportion in real time according to the total voltage of the N cells 110, so that the voltage obtained after the step-down meets the requirement of power supply of the system 130. The step-down proportion can be understood as the ratio between the output voltage and the input voltage of the step-down circuit.

The first step-down circuit 121 may be, for example, a Buck circuit, or a charging management circuit.

The embodiment of the present disclosure does not specifically limit the value of the power supply voltage converted by the first step-down circuit 121 of the electronic device, as long as the converted voltage can supply power to the system 130. The power supply voltage may be, for example, 3.4V, 3.2V or 3.7V, which needs to be set according to specific electronic device.

The first step-down circuit 121 may convert the total voltage of the N cells to the supply voltage of the electronic device not only under the circumstances that the voltage of the single cell is lower than the supply voltage of the electronic device, but also under the circumstances that the voltage of the single cell is higher than or equal to the supply voltage of the electronic device.

Of course, the first step-down circuit 121 does not convert the total voltage of the N cells 110 into the supply voltage of the system 130 under any circumstances. When the power of the N-saving core is too low, continue to supply power to the system will damage the battery cell and affect the service life of the battery cell. Therefore, in the solution provided by the embodiment of the present disclosure, when the voltage of the single battery cell in the N cell 110 reduces to the first threshold, it shows that the power of the cell is about to be exhaust. In such case, the first step-down circuit 121 may stop supplying power to the system 130 to protect the battery and avoid affecting its service life due to low power.

The first threshold may be lower than the shutdown voltage of the electronic device. The value of the first threshold may be determined according to the specific battery discharge curve, that is, the value of the first threshold may be determined according to the relationship between the capacity and the voltage of the battery. For example, the first threshold may be determined according to the voltage corresponding to 5% of the rated battery capacity, or it may also be determined according to the voltage corresponding to 7% of the rated battery capacity. For example, if the voltage corresponding to 5% of the rated battery capacity is 3.0V, the first threshold can be set to 3.0V.

Of course, the first threshold may also be determined according to other factors. For example, the first threshold may be determined according to the minimum operation voltage of the software, or may also be determined according to the minimum voltage at which the battery satisfies the charging condition.

Optionally, the embodiment of the present disclosure may also control the shutdown of the electronic device according to the total voltage of the N battery cells. When the total voltage of the N battery cells is lower than the second threshold, the control circuit can shut down the electronic device. For example, when N equals to 2, the second threshold may be 6.0V. The manner of determining the second threshold is similar to the first threshold, and may also be determined according to the relationship between the capacity and voltage of the battery, or may be determined according to other factors.

Figure 3:
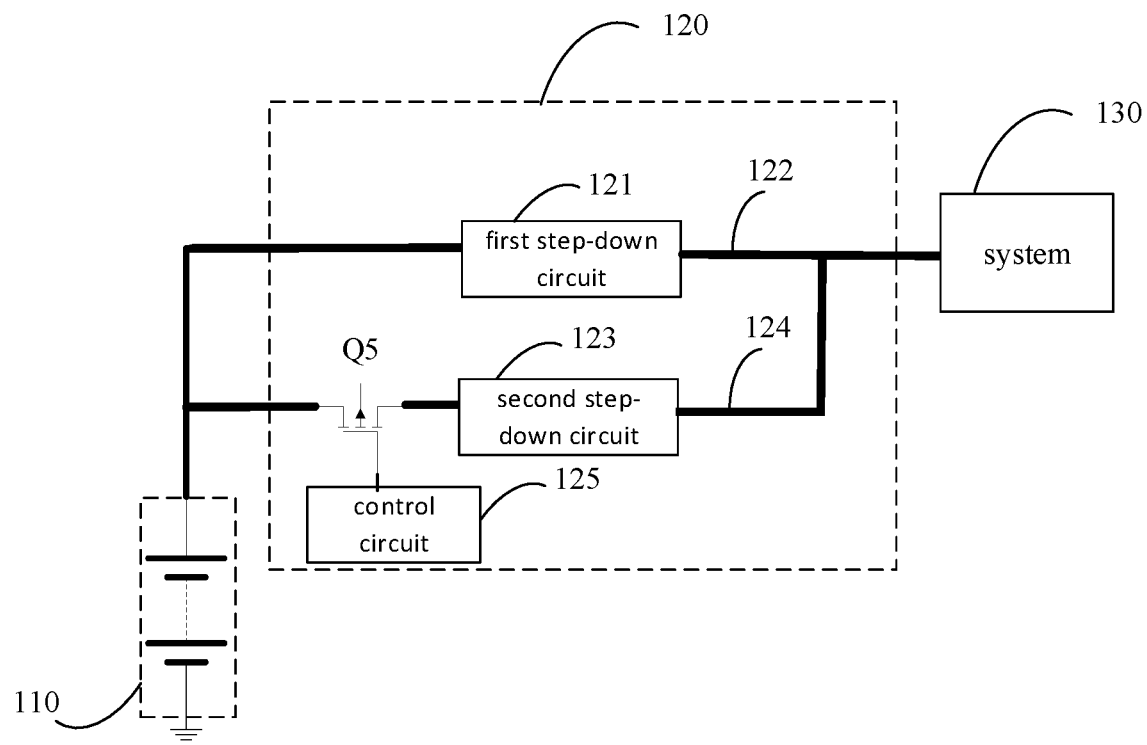
FIG. 3 is a schematic structural diagram of a power supply device provided by another embodiment of the present disclosure.

As an implementation manner, as shown in FIG. 3, the power supply device 120 in the embodiment of the present disclosure may further include a second step-down circuit 123 and a second power supply channel 124. The second step-down circuit 123 has a fixed step-down proportion. Assuming that the battery includes N cells connected in series, the step-down proportion of the second step-down circuit 123 can be 1/N, which means that the ratio between the output voltage and the input voltage of the second step-down circuit is 1:N. The second step-down circuit 123 can convert the total voltage of the N cells 110 into one Nth the total voltage of the N cells 110, that is, the second step-down circuit 123 can convert the total voltage of N cells to the average voltage of one cell. The second power supply channel 124 can be used to supply power to the system 130 of the electronic device according to the voltage converted by the second step-down circuit 123.

The voltage of each battery cell in the N battery cells 110 may not be exactly the same, and the voltage converted by the second step-down circuit is approximately equal to the average voltage of one cell in the N battery cells 110.

The second step-down circuit 123 may be, for example, a charge pump. The charge pump is mainly composed of switching devices. The heat generated by the current flowing through the switching devices is very small, which is almost equivalent to that of the current directly passing through the wires. Therefore, using the charge pump as a step-down circuit can not only reduce the voltage, but also has lower heat generation.

The second step-down circuit 123 can reduce the total voltage of the N cells 110 in case the voltage of the single cell in the N cells is higher than or equal to the shutdown voltage of the electronic device, so that the voltage obtained afterwards can meet the power supply requirements of the system 130. Since the voltage of the single battery cell is higher than or equal to the shutdown voltage of the electronic device, the voltage converted by the second step-down circuit 123 is also higher than or equal to the shutdown voltage of the electronic device. Therefore, when the voltage of a single battery cell is higher than or equal to the shutdown voltage of the electronic device, the voltage converted by the second step-down circuit 123 can meet the power supply requirements of the electronic device system 130 and able to supply power to the electronic device system 130.

The first step-down circuit 121 and the second step-down circuit 123 in the embodiment of the present disclosure can be used together to meet the power supply requirement of the system 130 and also maximize the use of the battery capacity.

Specifically, the power supply device 120 may further include a control circuit 125. The control circuit 125 can control the switching between the first power supply channel 122 and the second power supply channel 124. In case the voltage of the single battery cell is higher than or equal to the shutdown voltage of the electronic device, the control circuit 125 can control the second power supply channel 124 to work, and the first power supply channel 122 does not work. The second power supply channel 124 can supply power to the system 130 according to the voltage converted by the second step-down circuit 123. During the power supply, the voltage of the battery cell gradually drops. When the voltage of the single cell battery drops below the shutdown voltage of the electronic device, since the second step-down circuit 123 has a fixed step-down proportion, the voltage converted by the second step-down circuit 123 is lower than the shutdown voltage of the electronic device. Thus the voltage converted by the second step-down circuit 123 can no longer meet the power supply requirements of the system 130. In this case, the control circuit 125 can control the second power supply channel 124 to stop working, and the first power supply channel 122 start to work. The first power supply channel 122 can supply power to the system 130 according to the voltage converted by the first step-down circuit 122. During the operation of the first power supply channel 122, the voltage of the battery cell will continue to drop. When the voltage of a single battery cell drops below the first threshold, it means that the battery cell is about to run out and the control circuit can control the first power supply channel 122 stops working and controls the electronic device to shut down.

The control circuit 125 can switch between the first power supply channel 122 and the second power supply channel 124 through a switching device. Specifically, as shown in FIG. 3, the second power supply channel 124 may be provided with a switching tube Q5. When the control circuit 125 controls the switching tube Q5 to be turned on, the second power supply channel 124 works, and the second power supply channel 124 is used for the system 130 power supply; when the control circuit 125 controls the switch Q5 to turn off, the first power supply channel 122 works, and the first power supply channel 122 is used to power the system 130.

The embodiment of this disclosure does not specifically limit the type of electronic device. As long as the power supply mode of the electronic device uses the total voltage of N cells as a power supply unit to supply power to the system, the solution of the embodiment of this application can be adopted. For example, the electronic device may be an electric vehicle, which may include multiple battery cells. During the power supply process, the electric vehicle needs to convert the total voltage of the N battery cells into a supply voltage capable of supplying power to the system. In the process, the solution of the embodiment of the present disclosure can also be used to improve the utilization rate of the battery capacity.

Figure 4:
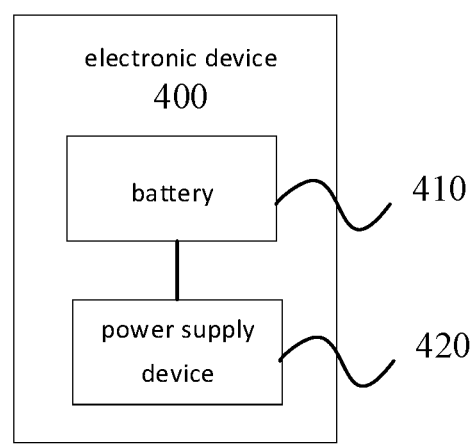
FIG. 4 is a schematic block diagram of an electronic device provided by an embodiment of the present disclosure.

As shown in FIG. 4, an embodiment of the present disclosure also provides an electronic device 400, which can improve the utilization rate of the battery capacity of the electronic device.

The electronic device 400 may include a battery 410 and any power supply device 420 described above. For brevity, the corresponding technical features can be referred to the above description, which will not be repeated here.

The embodiments of devices disclosed is described in detail above, and the embodiments of method are described below with reference to FIG. 5. The embodiment of method are corresponding to the embodiment of devices, and the parts that are not described in detail can be referred to the embodiment of device.

The embodiment of the present disclosure also provides a power supply method, which can improve the utilization rate of the battery capacity. As shown in FIG. 5, the method includes steps S510-S520.

S510. In the case that the voltage of the single cell in the N cells series connected with each other is lower than the shutdown voltage of the electronic device, converting the total voltage of the N cells into the power supply voltage using the first step-down circuit such that the supply voltage is greater than the shutdown voltage, and N is an integer greater than or equal to 2.

S520: The supplying power using the first power supply channel to the system of the electronic device according to the supply voltage.

Optionally, the method further includes: in the case that the voltage of the single cell in the N cells is higher than or equal to the shutdown voltage of the electronic device, using a second step-down circuit to convert the voltage of the total voltage of N cells, and the second step-down circuit has a step-down proportion of 1/N; the second power supply channel is used to power the system of the electronic device according to the voltage converted by the second step-down circuit.

Optionally, the method further includes: controlling the switching between the first power supply channel and the second power supply channel through a control circuit.

Optionally, the method further includes: in the case that the voltage of a single battery cell in the N cells is lower than a first threshold, controlling the electronic device to shut down by a control circuit, and the first threshold is lower than the shutdown voltage.

Optionally, the first threshold is determined according to the relationship between the capacity and voltage of the N battery cells.

Optionally, the battery cells of the multiple battery cells are silicon negative electrode lithium ion battery cell, tin negative electrode lithium ion battery cell or sodium ion battery cell.

Optionally, the first step-down circuit is a Buck circuit.

In addition, the embodiment of the present disclosure also provides a charging device, which can increase the charging speed of the battery.

FIG. 6 shows a schematic structural diagram of a charging system. The charging system 600 includes a power supply device 210, a charging device 220, and a battery 230. The charging device 220 can be used to manage the battery charging process.

As an exemplary embodiment, the charging device 220 can manage the charging process of the battery 230, such as selecting the charging channel, controlling the charging voltage and/or charging current, etc. As another exemplary embodiment, the charging device 220 can manage the cells of the battery 230, such as balancing the voltage of the battery cells in the battery 230, etc.

The charging device 220 may include a first charging channel 221 and a communication control circuit 223.

The first charging channel 221 may be used to receive the charging voltage and/or charging current provided by the power supply device 210 and load the charging voltage and/or charging current on both poles of the battery 230 to charge the battery 230.

The first charging channel 221 may be, for example, a wire. And some other circuit devices that are not related to the conversion of the charging voltage and/or the charging current may also be provided on the first charging channel 221. For example, the charging device 220 includes a first charging channel 221 and a second charging channel, and a switching device for switching between the charging channels can be provided on the first charging channel 221 (see the following description for details).

The power supply device may be a power supply device with an adjustable output voltage, but the embodiment of the present disclosure does not specifically limit the type of the power supply device 210. For example, the power supply device 210 may be a device dedicated to charging such as an adapter and a power bank, or may be a computer and other devices capable of providing power and data services.

The first charging channel 221 may be a direct charging channel, and the charging voltage and/or charging current provided by the power supply device 210 may be directly loaded on both poles of the battery 230. In order to implement the direct charging, the embodiment of the present disclosure introduces a control circuit with a communication function, that is, the communication control circuit 223, into the charging device 220. The communication control circuit 223 can maintain communication with the power supply device 210 during the direct charging process to form a closed-loop feedback mechanism, so that the power supply device 210 can learn the status of the battery in real time, thereby continuously adjusting the charging voltage and/or the charging current injected into the first charging channel, to ensure that the charging voltage and/or the charging current provided by the power supply device 210 matches the current charging stage of the battery 230.

The charging device 220 provided in the embodiment of the present disclosure can directly charge the battery 230. In other words, the charging device 220 provided in the embodiment of the present disclosure is a charging device that supports a direct charging framework. In the direct charging framework, there is no conversion circuit on a direct charging channel, thus the heat generated by the electronic device during the charging process is reduced. Optionally, in some embodiments, as shown in FIG. 6, the charging device 220 may further include a second charging channel 224. A boost circuit 225 is provided on the second charging channel 224. When the power supply device 210 charges the battery 230 through the second charging channel 224, the boost circuit 225 can be used to receive the initial voltage provided by the power supply device 210, boost the initial voltage to the target voltage, and charge the battery 230 based on the target voltage. When the initial voltage is lower than the total voltage of the battery 230, and the target voltage is higher than the total voltage of the battery 230; the communication control circuit 223 can also be used to control the switching between the first charging channel 221 and the second charging channel 224.

In case the battery 230 includes multiple battery cells, the second charging channel 224 can be compatible with common power supply equipment to charge the battery 230, which solves the problem that common power supply equipment cannot charge multiple batteries.

Taking a battery containing dual-cells as an example, when the power supply device can support direct charging of dual-cell series batteries, that is, when the power supply device can output a maximum voltage of 10V, the battery can be charged through the first charging channel 224. When the power supply device is an common power supply device, for example, when the output of the power supply device is 5V/1 A or 5V/2 A and cannot support the direct charging of dual-cell series batteries, the second charging channel can be used to charge the battery.

For a battery 230 containing multiple cells, the battery management circuit 220 may also include an equalization circuit 222. Refer to the above description, the equalization circuit 222 can be used to balance the voltage of the multiple cells during the charging and/or discharging process of the battery.

The power supply device shown in FIG. 2 and FIG. 3 may also include an equalization circuit for balancing the voltage of the multiple cells during the discharging process of the battery.

There are many manners to implement the equalization circuit. For example, a load can be connected to both poles of the battery cell to consume the battery's power to keep it consistent with the power of other battery cells, so that the voltage of each battery cell is consistent. Alternatively, the battery cell with a high battery charge can be used to charge the battery cell with a low battery charge for equalization until the voltage of each battery cell is consistent. For another example, the equalization circuit may be a Buck circuit. For example, the equalization circuit may be an equalization circuit based on an RLC series circuit, or an equalization circuit based on a Buck-Boost.

The embodiment of the present disclosure does not limit the specific form of the boost circuit 225. For example, a Boost circuit can be used, or a charge pump can be used for boosting. Optionally, in some embodiments, the second charging channel 224 may adopt a traditional charging channel design, that is, a conversion circuit (such as a charging IC) is provided on the second charging channel 224. The conversion circuit can perform constant voltage and constant current control on the charging process of the battery 230, and adjust the initial voltage provided by the power supply device 210, such as step-up or step-down, according to actual situations. The embodiment of the present disclosure may use the boost function of the conversion circuit to boost the initial voltage provided by the power supply device 210 to the target voltage.

The communication control circuit 223 can implement switching between the first charging channel 221 and the second charging channel 224 by a switching device. Specifically, the first charging channel 221 may be provided with a switching tube Q6. When the communication control circuit 223 controls the switching tube Q6 to be turned on, the first charging channel 221 start to work, and directly charge the battery 230; when the communication control circuit 223 controls the switching When the tube Q6 is turned off, the second charging channel 224 start to work, and the second charging channel 224 is used to charge the battery 230.

In other embodiments, a circuit or device for step-down can also be provided on the second charging channel 224, and when the voltage provided by the power supply device 210 is higher than the required voltage of the battery 230, a step-down processing can be performed. In the embodiment of the present disclosure, the circuit or module included in the second charging channel 224 is not limited.

The charging mode and power supply mode of the embodiment of the present disclosure will be described below with reference to FIG. 7.

During the charging process, the power supply device 310 may be used to charge the battery 330, and the battery 330 may include multiple battery cells connected in series. When the output voltage of the power supply device is adjustable and the maximum output voltage can meet the charging requirement of the battery 330, the first charging channel 321 can be used to directly charge the battery 330. When the maximum output voltage of the power supply device 310 cannot meet the charging requirement of the battery 330, that is, the maximum output voltage of the power supply device 310 is lower than the charging voltage of the battery 330, the battery 330 can be charged through the second charging channel 322. The boost circuit 323 within the second charging channel 322 can boost the output voltage of the power supply device 310, and the boosted voltage can meet the charging requirement of the battery 330.

During the power supply process, the battery 330 can supply power to the system 350 through the first power supply channel 342 or the second power supply channel 343. Referring to the foregoing description, when the voltage of a single battery cell among the multiple cells in the battery 330 is higher than or equal to the shutdown voltage of the system, the second power supply channel 343 may be used to supply power to the system 350. In this case, the second step-down circuit 344 can step down the voltage of the battery 330, and the second power supply channel 343 can supply power to the system 350 according to the voltage stepped down by the second step-down circuit 344. The second step-down circuit 344 is a step-down circuit with a fixed step-down proportion. When the voltage of a single battery cell among the multiple cells in the battery 330 is lower than the shutdown voltage of the system, the first power supply channel 342 may be used to supply power to the system. In this case, the first step-down circuit can convert the voltage of the battery 330 into the supply voltage of the system 350, and the first power supply channel 342 can supply power to the system 350 according to the voltage converted by the first step-down circuit 341. Wherein, the first step-down circuit 341 can automatically adjust the step-down proportion according to the voltage of the battery 330, and the first step-down circuit 341 can adjust the step-down proportion in real time to convert the voltage of the battery 330 into the supply voltage of the system 350.

Figure 7:
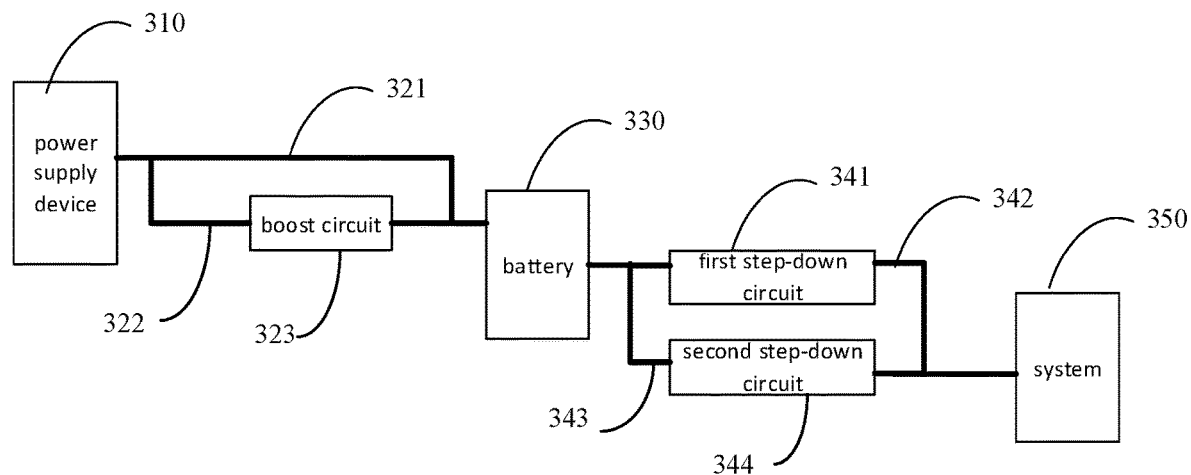
FIG. 7 is a schematic structural diagram of a charging and discharging device provided by an embodiment of the present disclosure.

For parts that are not described in detail in FIG. 7, please refer to the foregoing description. In order to avoid repetition, details are not described herein again.

In addition to the wired charging method described above, the embodiment of the present disclosure may also adopt a wireless charging method.

The wireless charging process applied in the embodiment of the present disclosure will be described below with reference to FIGS. 8-11.

The traditional wireless charging technology generally connects the power supply device (such as an adapter) with a wireless charging device (such as a wireless charging base), and charging the device to be charged by transmitting the output power of the power supply device wirelessly (such as electromagnetic waves) to the device to be charged through the wireless charging device.

According to different principles of wireless charging, wireless charging methods are mainly divided into three manners: magnetic coupling (or electromagnetic induction), magnetic resonance, and radio waves. Currently, the most popular wireless charging standards include QI standard, power matters alliance (PMA) standard, and alliance for wireless power (A4WP). Both the QI standard and the PMA standard use magnetic coupling for wireless charging. The A4WP standard uses magnetic resonance for wireless charging.

The wireless charging method of an embodiment will be introduced below in conjunction with FIG. 8.

Figure 8:
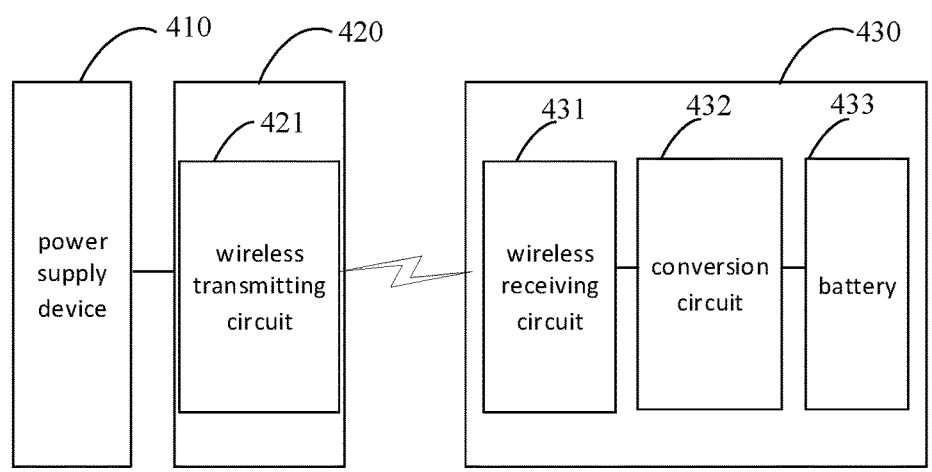
FIG. 8 is a schematic structural diagram of a wireless charging system provided by an embodiment of the present disclosure.

As shown in FIG. 8, the wireless charging system includes a power supply device 410, a wireless charging signal transmitting device 420, and a charging control device 430. Wherein, the transmitting device 420 may be, for example, a wireless charging stand, and the charging control device 430 may refer to the device to be charged. The device to be charged may be, for example, the electronic device described above.

Once the power supply device 410 is connected to the transmitting device 420, the output voltage and output current of the power supply device 410 are transmitted to the transmitting device 420.

The transmitting device 420 may convert the output voltage and output current of the power supply device 410 into a wireless charging signal (for example, an electromagnetic signal) through an internal wireless transmitting circuit 421 for transmission. For example, the wireless transmitting circuit 421 can convert the output current of the power supply device 410 into alternating current, and convert the alternating current into a wireless charging signal through a transmitting coil or a transmitting antenna.

FIG. 8 only exemplarily shows a schematic structural diagram of the wireless charging system, but the embodiment of the present disclosure is not limited thereto. For example, the transmitting device 420 may also be called a wireless charging signal transmitting device, and the charging control device 430 may also be called a wireless charging signal receiving device. The wireless charging signal receiving device may be, for example, a chip with a wireless charging signal receiving function, which can receive the wireless charging signal transmitted by the transmitting device 420; the wireless charging signal receiving device may also be a device to be charged.

The charging control device 430 may receive the wireless charging signal transmitted by the wireless transmitting circuit 421 through the wireless receiving circuit 431, and convert the wireless charging signal into the output voltage and output current of the wireless receiving circuit 431. For example, the wireless receiving circuit 431 may convert the wireless charging signal transmitted by the wireless transmitting circuit 421 into alternating current through a receiving coil or a receiving antenna, and perform operations such as rectification and/or filtering on the alternating current to convert the alternating current into the output voltage and output current of the wireless receiving circuit 131.

In some embodiments, before wireless charging, the transmitting device 420 and the charging control device 430 negotiate the transmission power of the wireless transmitting circuit 421 in advance. Assuming that the power negotiated between the transmitting device 420 and the charging control device 430 is 5 W, the output voltage and output current of the wireless receiving circuit 431 are generally 5V and 1 A. Assuming that the power negotiated between the transmitting device 420 and the charging control device 430 is 10.8 W, the output voltage and output current of the wireless receiving circuit 431 are generally 9V and 1.2 A.

If the output voltage of the wireless receiving circuit 431 is not suitable to be directly applied to the two poles of the battery 433, it is necessary to perform constant voltage and/or constant current control through the conversion circuit 432 within the charging control device 430 to obtain the expected charging voltage and/or charging current of the battery 433 in the charging control device 430.

The conversion circuit 432 can be used to convert the output voltage of the wireless receiving circuit 431 so that the output voltage and/or output current of the conversion circuit 432 meets the expected charging voltage and/or charging current requirements of the battery 433.

As an example, the conversion circuit 432 may be, for example, a charging integrated circuit (IC), or may be a power management circuit. During the charging process of the battery 433, the conversion circuit 132 can be used to manage the charging voltage and/or charging current of the battery 433. The conversion circuit 432 may include a voltage feedback function and/or a current feedback function to implement the management of the charging voltage and/or charging current of the battery 433.

In a normal charging process, the required charging voltage and/or charging current of the battery may be continuously changing in different charging stages. The output voltage and/or output current of the wireless receiving circuit may need to be continuously adjusted to meet the immediate charging requirements of the battery. For example, in the constant current charging phase of the battery, the charging current of the battery remains unchanged during the charging process, but the voltage of the battery is continuously increasing, so the charging voltage required by the battery is also continuously increasing. As the charging voltage required by the battery continues to increase, the charging power required by the battery is also increasing. When the charging power required by the battery increases, the wireless receiving circuit needs to increase the output power to meet the charging demand of the battery.

When the output power of the wireless receiving circuit is lower than the charging power currently required by the battery, the communication control circuit may transmit instruction information to the transmitting device to instruct the transmitting device to increase the transmitting power to increase the output power of the wireless receiving circuit. Therefore, during the charging process, the communication control circuit may communicate with the transmitting device, so that the output power of the wireless receiving circuit can meet the charging requirements of the battery in different charging stages.

The embodiment of the present disclosure does not specifically limit the communication mode between the communication control circuit 435 and the transmitting device 420. Optionally, in some embodiments, the communication control circuit 435 and the transmitting device 420 may adopt Bluetooth communication, wireless fidelity (Wi-Fi) communication, or backscatter modulation (or power Load modulation method) communication, short-range wireless communication based on high carrier frequency, optical communication, ultrasonic communication, ultra-wideband communication or mobile communication and other wireless communication methods for communication.

In an embodiment, the short-range wireless communication module based on a high carrier frequency may include an integrated circuit (IC) chip with an extremely high frequency (EHF) antenna packaged inside. Optionally, the high carrier frequency may be 60 GHz.

In an embodiment, the optical communication may use an optical communication module for communication. The optical communication module may include an infrared communication module, and the infrared communication module may use infrared to transmit information.

In an embodiment, mobile communication may be communication using a mobile communication module. The mobile communication module can use mobile communication protocols such as 5G communication protocol, 4G communication protocol or 3G communication protocol for information transmission.

Using the above-mentioned wireless communication method, compared to the method of communicating by coupling to the coil of the wireless receiving circuit in the Qi standard through signal modulation, the reliability of communication can be improved, and the voltage ripple caused by signal coupling communication can be avoided. Affects on the voltage processing of the step-down circuit can be avoided too.

Optionally, the communication control circuit 435 and the transmitting device 420 may also communicate in a wired communication by a data interface.

Figure 9:
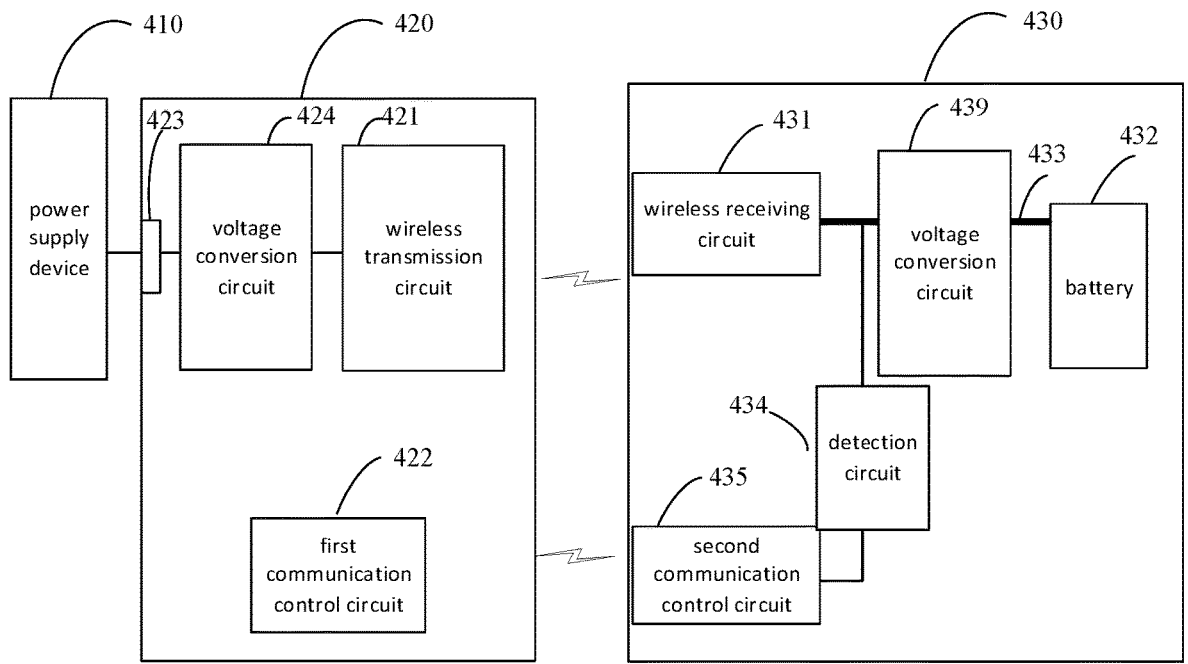
FIG. 9 is a schematic structural diagram of a wireless charging system provided by another embodiment of the present disclosure.

FIG. 9 is a schematic diagram of a charging system provided by another embodiment of the present disclosure. Referring to FIG. 9, the wireless charging signal transmitting device 420 may further include a charging interface 423, and the charging interface 423 may be used to connect with an external power supply device 410. The wireless transmitting circuit 421 may also be used to generate a wireless charging signal according to the output voltage and output current of the power supply device 410.

The first communication control circuit 422 can also adjust the amount of power drawn by the wireless transmission circuit 421 from the output power of the power supply device 410 during the wireless charging process to adjust the transmission power of the wireless transmission circuit 421 so that the power transmitted by the wireless transmission circuit can meet the charging demand of the battery. For example, the power supply device 410 can also directly output a relatively large fixed power (for example, 40 W), and the first communication control circuit 422 can directly adjust the amount of power drawn by the wireless transmitting circuit 421 from the fixed power provided by the power supply device 410.

In the embodiment of the present disclosure, the output power of the power supply device 410 may be fixed. For example, the power supply device 410 can directly output a relatively large fixed power (for example, 40 W), and the power supply device 410 can provide the wireless charging device 420 with output voltage and output current according to the fixed output power. During the charging process, the first communication control circuit 422 can draw a certain amount of power from the fixed power of the power supply device for wireless charging according to actual needs. That is to say, the embodiment of the present disclosure allocates the control function for adjusting the transmission power of the wireless transmission circuit 421 to the first communication control circuit 422. And the first communication control circuit 422 can immediately adjust the transmission power of the wireless transmission circuit 421, when receiving the instruction information sent by the second communication control circuit 435, to meet the current charging requirements of the battery, which has the advantages of fast adjustment speed and high efficiency.

The embodiment of the present disclosure does not specifically limit the manner in which the first communication control circuit 422 draw power from the maximum output power provided by the power supply device 410. For example, a voltage conversion circuit 424 may be provided inside the transmitting device 420 of the wireless charging signal, and the voltage conversion circuit 424 may be connected to the transmitting coil or the transmitting antenna for adjusting the power received by the transmitting coil or the transmitting antenna. The voltage conversion circuit 424 may comprises, for example, a pulse width modulation (PWM) controller and a switch unit. The first communication control circuit 422 can adjust the transmission power of the wireless transmission circuit 421 by adjusting the duty cycle of the control signal sent by the PWM controller.

The embodiment of the present disclosure does not specifically limit the type of the power supply device 410. For example, the power supply device 410 may be a device such as an adapter, a power bank, a car charger, or a computer.

The embodiment of the present disclosure does not specifically limit the type of the charging interface 423. Optionally, in some embodiments, the charging interface 423 may be a USB interface. The USB interface may be, for example, a USB 2.0 interface, a micro USB interface, or a USB TYPE-C interface. Optionally, in other embodiments, the charging interface 423 may also be a lightning interface, or any other type of parallel port and/or serial port that can be used for charging.

The embodiment of the present disclosure does not specifically limit the communication manner between the first communication control circuit 422 and the power supply device 410. As an example, the first communication control circuit 422 may be connected to the power supply device 410 through a communication interface other than the charging interface, and communicate with the power supply device 410 through the communication interface. As another example, the first communication control circuit 422 may communicate with the power supply device 410 in a wireless manner. For example, the first communication control circuit 422 may perform near field communication (NFC) with the power supply device 410. As another example, the first communication control circuit 422 can communicate with the power supply device 410 through the charging interface 423 without setting an additional communication interface or other wireless communication module, which can simplify the implementation of the wireless charging device 420. For example, the charging interface 423 is a USB interface, and the first communication control circuit 422 can communicate with the power supply device 410 based on the data lines (such as D+ and/or D− lines) in the USB interface. For another example, the charging interface 423 may be a USB interface (such as a USB TYPE-C interface) supporting a power delivery (PD) communication protocol, and the first communication control circuit 422 and the power supply device 410 may communicate based on the PD communication protocol.

Optionally, adjusting the transmission power of the wireless charging signal by the first communication control circuit 422 may refer to that the first communication control circuit 422 adjusts the transmission power of the wireless charging signal by adjusting the input voltage and/or input current of the wireless transmission circuit 421. For example, the first communication control circuit may increase the transmission power of the wireless transmission circuit by increasing the input voltage of the wireless transmission circuit.

Figure 11:
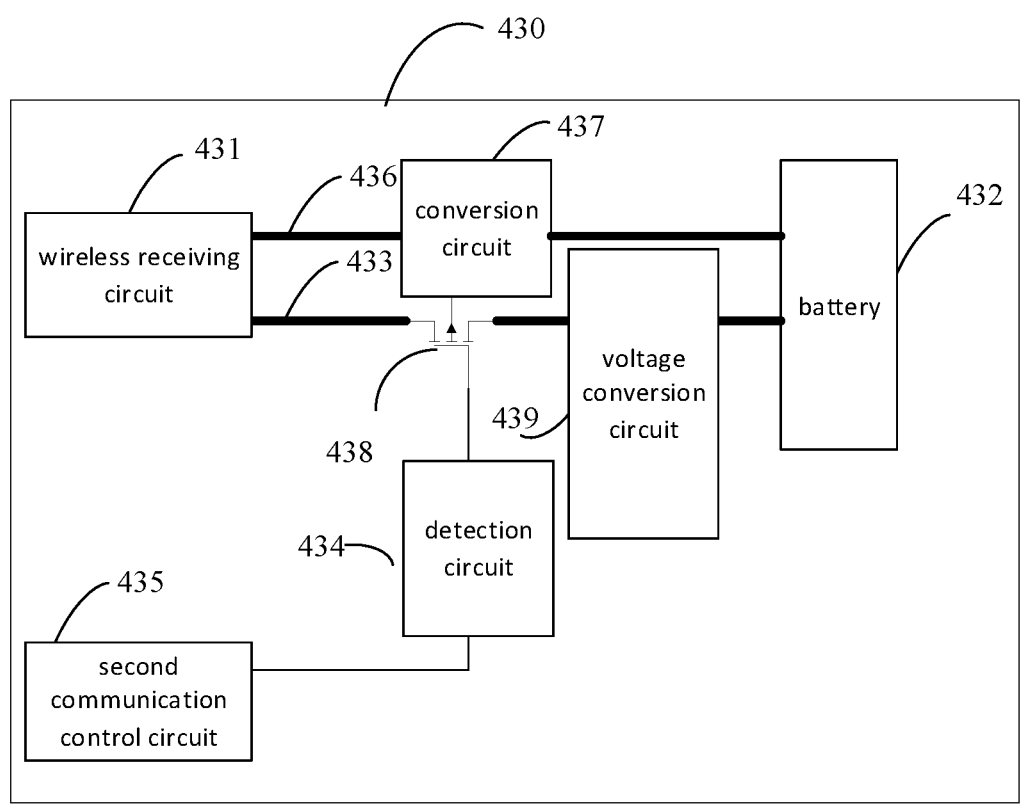
FIG. 11 is a schematic structural diagram of a wireless charging system provided by another embodiment of the present disclosure.

Optionally, as shown in FIG. 11, the device to be charged 430 further includes a first charging channel 433, through which the output voltage and/or output current of the wireless receiving circuit 431 can be provided to the battery 432 to charge the battery 432.

Optionally, a voltage conversion circuit 439 may be further provided on the first charging channel 433, and the input of the voltage conversion circuit 439 is electrically connected to the output of the wireless receiving circuit 431, and is used to perform a constant voltage control and/or constant current control on the output voltage of the wireless receiving circuit 431, to charge the battery 432 so that the output voltage and/or output current of the voltage conversion circuit 439 matches the charging voltage and/or charging current currently required by the battery.

Optionally, increasing the transmission power of the wireless transmission circuit 421 may refer to increasing the transmission voltage of the wireless transmission circuit 421, and increasing the transmission voltage of the wireless transmission circuit 421 may be achieved by increasing the output voltage of the voltage conversion circuit 424. For example, when the first communication control circuit 422 receives the instruction to increase the transmission power sent by the second communication control circuit 435, it can increase the transmission power of the wireless transmission circuit 421 by increasing the output voltage of the voltage conversion circuit 424.

The embodiment of the present disclosure does not specifically limit the manner in which the second communication control circuit 435 sends instruction information to the first communication control circuit 422.

For example, the second communication control circuit 435 may periodically send instruction information to the first communication control circuit 422. Alternatively, the second communication control circuit 435 sends instruction information to the first communication control circuit 422 in case the transmission power of the wireless transmission circuit 421 needs to be adjusted.

Optionally, the wireless charging signal receiving device may further include a detection circuit 434, which can detect the voltage and/or current on the first charging channel 433. The second communication control circuit 235 can send instruction information to the first communication control circuit 422 to instruct the first communication control circuit 422 to adjust the output voltage and output current corresponding to the transmit power of the wireless transmitting circuit 421, based on the voltage and/or current on the first charging channel 433.

In one embodiment, for the device to be charged, during the constant current charging process, the voltage of the battery will continue to rise, and the charging power required by the battery will also increase accordingly. At this time, the transmit power of the wireless charging signal needs to be increased to meet the current charging requirements of the battery. During the constant voltage charging process, the charging current of the battery may continue to decrease, and the charging power required by the battery will also decrease accordingly. At this time, the transmit power of the wireless charging signal needs to be reduced to meet the current charging requirements of the battery.

The first communication control circuit 422 can adjust the transmission power of the wireless charging signal according to the instruction information. It can mean that the first communication control circuit 422 adjusts the transmission power of the wireless charging signal so that the transmission power of the wireless charging signal matches the current required charging voltage and/or the charging current of the battery.

The matching of the transmission power of the wireless transmission circuit 421 with the charging voltage and/or charging current currently required by the battery 432 may refer to: the first communication control circuit 422 sets the transmission power of the wireless charging signal with a configuration, such that the output voltage and/or the output current of the first charging channel 433 matches the charging voltage and/or charging current currently required by the battery 432 (or, the configuration of the transmission power of the wireless charging signal by the first communication control circuit 422 makes the output voltage and/or the output current of the first charging channel 433 meets the charging requirements of the battery 432 (including the requirements of the battery 432 for charging voltage and/or charging current)).

It should be understood that, in an embodiment of the present disclosure, "the output voltage and/or output current of the first charging channel 432 matches the charging voltage and/or charging current currently required by the battery 432" comprises: the voltage and/or current of the output direct current by the first charging channel 432 is equal to the charging voltage and/or charging current required by the battery 432 or within a preset drifting range (for example, the drift of voltage value is 100 mV-200 mV, the drift of current value is 0.001 A-0.005 A, etc.).

The second communication control circuit 435 described above performs wireless communication with the first communication control circuit 422 according to the current and/or voltage of the first charging channel 433 detected by the detection circuit 434, so that the first communication control circuit 422 can adjust the transmitting power of the wireless transmitting circuit 421 according to the current and/or voltage of the first charging channel 433 may include: during the constant current charging phase of the battery 432, the second communication control circuit 435 performs wireless communication with the communication control circuit 422 according to the detected current and/or voltage of the first charging channel 433, so that the first communication control circuit 422 adjusts the transmission power of the wireless transmission circuit 421. Thus the output voltage of the first charging channel 433 matches the charging voltage required by the battery in the constant current charging stage (or, the output voltage of the first charging channel 433 meets the charging voltage requirement of the battery 432 in the constant current charging stage).

Figure 10:
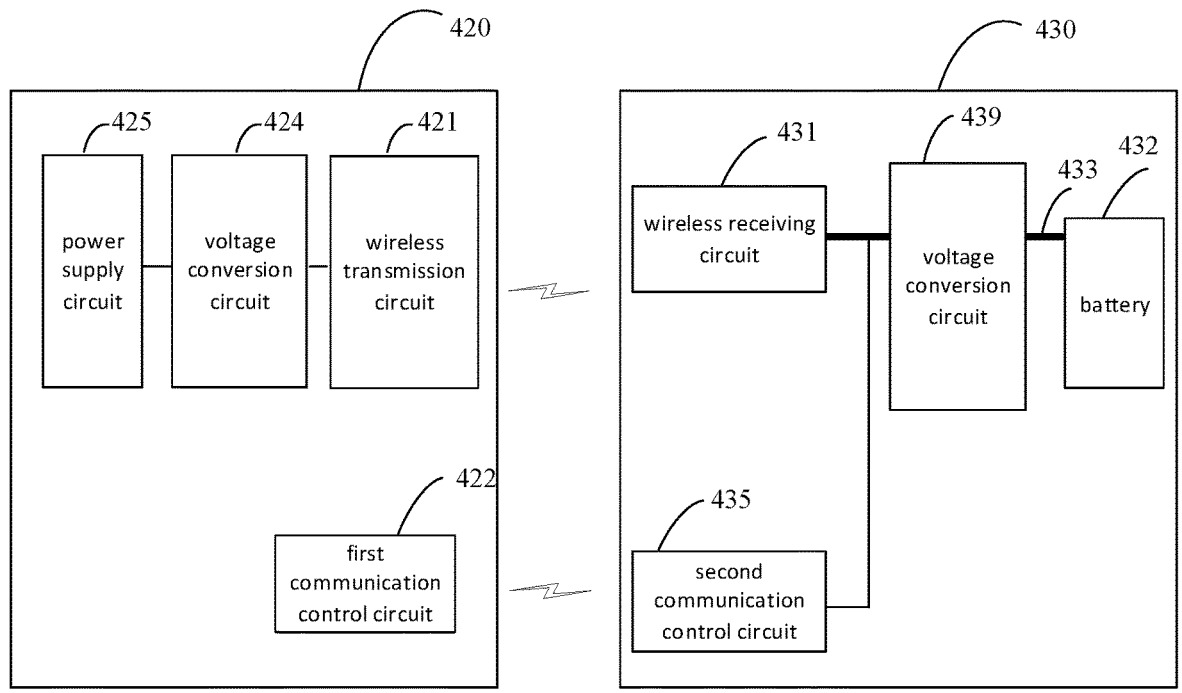
FIG. 10 is a schematic structural diagram of a wireless charging system provided by another embodiment of the present disclosure.

FIG. 10 is another example of a charging system provided by an embodiment of the present disclosure. The wireless charging signal transmitting device 420 corresponding to the embodiment of FIG. 10 does not obtain electric energy from the power supply device 410, but directly converts the external input AC power (such as commercial power) into the above-mentioned wireless charging signal.

As shown in FIG. 10, the wireless charging signal transmitting device 420 may further include a voltage conversion circuit 424 and a power supply circuit 425. The power supply circuit 425 can be used to receive external AC power (such as commercial power), and generate the output voltage and output current of the power supply circuit 425 according to the AC power. For example, the power supply circuit 425 may rectify and/or filter the AC power to obtain direct current or pulsating direct current, and transmit the direct current or pulsating direct current to the voltage conversion circuit 424.

The voltage conversion circuit 424 can be used to receive the output voltage of the power supply circuit 425 and convert the output voltage of the power supply circuit 425 to obtain the output voltage and output current of the voltage conversion circuit 424. The wireless transmitting circuit 421 can also be used to generate a wireless charging signal according to the output voltage and output current of the voltage conversion circuit 424.

The embodiment of the present disclosure integrates a function similar to an adapter inside the wireless charging signal transmitting device 420, so that the wireless charging signal transmitting device 420 does not need to obtain power from an external power supply device, which improves the integration of the wireless charging signal transmitting device 420 and reduce the number of devices required of the wireless charging process.

Optionally, in some embodiments, the wireless charging signal transmitting device 420 may support the first wireless charging mode and the second wireless charging mode. The wireless charging signal transmitting device 420 charges the device to be charged faster in the first wireless charging mode than the in the second wireless charging mode. In other words, compared with the second wireless charging mode, the wireless charging signal transmitting device 420 uses less time to fully charge the device to be charged with the same capacity in the first wireless charging mode The embodiment of the present disclosure may use the first charging mode for charging, and may also use the second charging mode for charging. It is not limited in the embodiment of the present disclosure.

The second wireless charging mode may be a so-called normal wireless charging mode, for example, may be a traditional wireless charging mode based on the QI standard, the PMA standard, or the A4WP standard. The first wireless charging mode may be a fast wireless charging mode. The normal wireless charging mode may refer to a wireless charging mode in which the transmitting power of the wireless charging signal transmitter 220 is relatively small (usually less than 15 W, and the commonly used transmitting power is 5 W or 10 W). In the normal wireless charging mode, it usually takes several hours to fully charge a large-capacity battery (such as a 3000 mAh battery). In the fast wireless charging mode, the transmission power of the wireless charging signal transmitter 220 is relatively large (usually higher than or equal to 15 W). Compared with the normal wireless charging mode, the wireless charging signal transmitter 220 in the fast wireless charging mode has a significantly shorter charging time and a faster charging speed.

Referring to FIG. 11, in an embodiment of the present disclosure, the device to be charged 430 further includes: a second charging channel 436. The second charging channel 436 may be a wire. A conversion circuit 437 can be provided on the second charging channel 436 to perform voltage control on the DC power output by the wireless receiving circuit 431 to obtain the output voltage and output current of the second charging channel 436 to charge the battery 432.

In one embodiment, the conversion circuit 437 can be used in the step-down circuit, and output constant current and/or constant voltage electric energy. In other words, the conversion circuit 437 can be used to perform constant voltage and/or constant current control on the battery charging process.

When the second charging channel 436 is used to charge the battery 432, the wireless transmitting circuit 421 can use a constant transmitting power to transmit electromagnetic signals. After the wireless receiving circuit 431 receives the electromagnetic signals, the signal is converted into a voltage and current that meets the charging requirements of the battery 432 by the conversion circuit 437, and is input to the battery 432 to charge the battery 432. It should be understood that, in some embodiments, the constant transmission power does not necessarily mean that the transmission power remains completely unchanged, and it can fluctuates within a certain range, for example, the transmission power is 7.5 W and fluctuates 0.5 W.

In the embodiment of the present disclosure, the charging method for charging the battery 432 through the first charging channel 433 is the first wireless charging mode, and the charging method for charging the battery 432 through the second charging channel 436 is the second wireless charging mode. The wireless charging signal transmitter and the device to be charged can determine whether to use the first wireless charging mode or the second wireless charging mode to charge the battery 432 through a handshake communication.

In the embodiment of the present disclosure, for the transmitting device of the wireless charging signal, when the device to be charged is charged in the first wireless charging mode, the maximum transmitting power of the wireless transmitting circuit 421 may be the first transmitting power. When the device to be charged is charged in the second wireless charging mode, the maximum transmission power of the wireless transmission circuit 421 may be the second transmission power. Wherein, the first transmission power is greater than the second transmission power, and thus, the charging speed of the device to be charged in the first wireless charging mode is faster than the second wireless charging mode.

Optionally, the second communication control circuit 435 can also be used to control the switching between the first charging channel 433 and the second charging channel 436. For example, as shown in FIG. 11, a switch 438 can be provided on the first charging channel 433, and the second communication control circuit 435 can control the switch between first charging channel 433 and the second charging channel 436 by controlling the on and off of the switch 438. As pointed out above, in some embodiments, the wireless charging signal transmitting device 420 may include a first wireless charging mode and a second wireless charging mode, and the wireless charging signal transmitting device 420 charges the device to be charged 430 faster in the first wireless charging mode than the in the second wireless charging mode. When the wireless charging signal transmitter 420 uses the first wireless charging mode to charge the battery in the device to be charged 430, the device to be charged 430 can control the first charging channel 433 to work; when the wireless charging signal transmitter 420 uses the second wireless charging mode to charge the battery in the device to be charged 430, the device to be charged 430 can control the second charging channel 436 to work.

For the device to be charged, the second communication control circuit 435 can switch between the first charging channel 433 and the second charging channel 436 according to the charging mode. When the first wireless charging mode is adopted, the second communication control circuit 435 controls the voltage conversion circuit 439 on the first charging channel 433 to work. When the second wireless charging mode is adopted, the second communication control circuit 435 controls the conversion circuit 437 on the second charging channel 436 to work.

Optionally, the wireless charging signal transmitting device 420 may communicate with the device to be charged 430 to negotiate a charging mode between the wireless charging signal transmitting device 420 and the device to be charged 430.

In addition to the communication content described above, the first communication control circuit 422 in the wireless charging signal transmitting device 420 and the second communication control circuit 435 in the device to be charged 430 can also exchange many other information. In some embodiments, the first communication control circuit 422 and the second communication control circuit 435 can exchange information for safety protection, anomaly detection or fault handling, such as the temperature information of the battery 432, indication information of entering the overvoltage protection or overcurrent protection, power transmission efficiency information (the power transmission efficiency information can be used to indicate the power transmission efficiency between the wireless transmitting circuit 421 and the wireless receiving circuit 431).

Optionally, the communication between the second communication control circuit 435 and the first communication control circuit 422 may be one-way communication or two-way communication, which is not specifically limited in the embodiment of the present disclosure.

In the embodiment of the present disclosure, the function of the second communication control circuit can be implemented by the application processor of the device to be charged 430, thus, the hardware cost can be saved. Alternatively, it can also be implemented by an independent control chip, which can improve the reliability of control.

Optionally, in the embodiment of the present disclosure, the wireless receiving circuit 432 and the voltage conversion circuit 439 can be integrated in the same wireless charging chip, which can improve the integration of the device to be charged and simplify the implementation of the device to be charged. For example, the functions of traditional wireless charging chips can be expanded to support charging management functions.

In the above embodiments, it may be implemented in whole or in part by software, hardware, firmware or any other combination. When implemented by software, it can be implemented in the form of a computer program product in whole or in part. The computer program product includes one or more computer instructions. When the computer program instructions are loaded and executed on the computer, the processes or functions described in the embodiments of the present disclosure are generated in whole or in part. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from a website, computer, server, or data center to another website, computer, server or data center via wired (such as coaxial cable, optical fiber, digital subscriber line, DSL) or wireless (such as infrared, wireless, microwave, etc.) communication. The computer-readable storage medium may be any available medium that can be accessed by a computer or a data storage device such as a server or a data center integrated with one or more available media. The available medium may be a magnetic medium (for example, a floppy disk, a hard disk, a magnetic tape), an optical medium (for example, a digital video disc, DVD), or a semiconductor medium (for example, a solid state disk, SSD), etc.

The present disclosure can be applied to scenarios where multiple battery cells are used to supply power to the system. In case the voltage of a single battery cell in the multiple battery cells is lower than the shutdown voltage of the electronic device, instead of shutdown directly, the voltage of the multi-cell battery is converted into a power supply voltage capable of supplying power to the system, and continues to supply power to the system. In this way, the power of the battery cell can be maximized to improve the battery life.

A person of ordinary skill in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of this disclosure.

In several embodiments provided in this application, it should be understood that the disclosed system, device, and method may be implemented in other ways. For example, the device embodiments described above are only illustrative. For example, the division of the units is only a logical function division, and there may be other divisions in actual implementation, for example, multiple units or components can be combined or It can be integrated into another system, or some features can be ignored or not executed. In addition, the described or discussed mutual coupling or direct coupling or communication connection may be indirect coupling or communication connection through some interfaces, devices or units, and may be in electrical, mechanical or other forms.

The units described as separate components may or may not be physically separated, and the components described as units may or may not be physical units, that is, they may be located in one place, or they may be distributed on multiple network units. Some or all of the units may be selected according to actual needs to achieve the aims of the solutions of the embodiments.

In addition, the functional units in each embodiment of the present disclosure may be integrated into one processing unit, or each unit may exist alone physically, or two or more units may be integrated into one unit.

Above are only specific implementations of this disclosure, but the protection scope of this disclosure is not limited to this. Any changes or substitutions which can be easily think of within the technical scope disclosed in this disclosure should be covered within the scope of protection of this disclosure. Therefore, the protection scope of this disclosure should be subject to the protection scope of the claims.

The invention claimed is:

1. A power supply device comprising:
   a first step-down circuit configured to convert, in response to a voltage of a single battery cell among N battery cells connected in series is lower than a shutdown voltage of an electronic device, a total voltage of the N battery cells into a power supply voltage of the electronic device, so that the power supply voltage becomes higher than or equal to the shutdown voltage, wherein N is an integer greater than or equal to 2; and
   a first power supply channel, configured to supply power to a system of the electronic device at the power supply voltage;
   a second step-down circuit configured to perform conversion on the total voltage of the N battery cells, in response to the voltage of a single cell among the N battery cells is higher than or equal to the shutdown voltage of the electronic device, wherein the second step-down circuit has a step-down proportion of 1/N; and
   a second power supply channel configured to supply power to the system of the electronic device at the voltage converted by the second step-down circuit.

2. The power supply device of claim 1, further comprising:
   a control circuit configured to switch between the first power supply channel and the second power supply channel.

3. The power supply device of claim 1, further comprising:

a control circuit configured to control the electronic device to shut down, in response to the voltage of a single battery cell among the N battery cells is lower than a first threshold, the first threshold being lower than the shutdown voltage.

4. The power supply device of claim 3, wherein the control circuit is configured to determine the first threshold according to a relationship between a capacity of the N battery cells and the total voltage of the N battery cells.

5. The power supply device of claim 1, wherein the N battery cells comprise a silicon anode lithium ion battery, a tin anode lithium ion battery, or a sodium ion battery.

6. The power supply device of claim 1, wherein the first step-down circuit comprises a Buck circuit.

7. An electronic device comprising
a battery; and
a power supply device comprising:
  a first step-down circuit configured to convert, in response to a voltage of a single battery cell among N battery cells connected in series is lower than a shutdown voltage of an electronic device, a total voltage of the N battery cells into a power supply voltage of the electronic device, so that the power supply voltage becomes higher than or equal to the shutdown voltage, wherein N is an integer greater than or equal to 2; and
  a first power supply channel, configured to supply power to a system of the electronic device at the power supply voltage;
  a second step-down circuit configured to perform conversion on the total voltage of the N battery cells, in response to the voltage of a single cell among the N battery cells is higher than or equal to the shutdown voltage of the electronic device, wherein the second step-down circuit has a step-down proportion of $1/N$; and
  a second power supply channel configured to supply power to the system of the electronic device at the voltage converted by the second step-down circuit.

8. A power supply method comprising:
converting, by using a first step-down circuit and in response to a voltage of a single battery cell among N battery cells connected in series is lower than a shutdown voltage of an electronic device, a total voltage of the N battery cells into a power supply voltage of the electronic device, so that the supply voltage becomes higher than or equal to the shutdown voltage, wherein N is an integer greater than or equal to 2; and
supplying, by the first step-down circuit and through a first power supply channel, power to a system of the electronic device at the power supply voltage;
performing, by using a second step-down circuit, conversion on the total voltage of the N battery cells in response to the voltage of a single cell among the N battery cells is higher than or equal to the shutdown voltage of the electronic device, wherein the second step-down circuit has a step-down proportion of $1/N$; and
supplying, by the second step-down circuit and through a second power supply channel, power to the system of the electronic device according to the voltage converted.

9. The power supply method of claim 8, further comprising:
switching, by using a control circuit, a source of the power to the system of the electronic device between the first power supply channel and the second power supply channel.

10. The power supply method of claim 8, further comprising
controlling, by using a control circuit, the electronic device to shut down in response to the voltage of a single battery cell among the N battery cells is lower than a first threshold, the first threshold being lower than the shutdown voltage.

11. The power supply method of claim 10, further comprising:
determining the first threshold according to a relationship between a capacity of the N battery cells and the total voltage of the N battery cells.

12. The power supply method of claim 8, wherein the N battery cells comprise a silicon negative electrode lithium ion battery, a tin negative electrode lithium ion battery, or a sodium ion battery.

13. The power supply method of claim 8, wherein the first step-down circuit comprises a Buck circuit.

* * * * *